(Model.)

2 Sheets—Sheet 1.

J. VALENTINE.
Corn Sheller.

No. 243,176.

Patented June 21, 1881.

Witnesses.

Inventor

Jacob Valentine
By W. Davidson Jones
atty (Model.)  2 Sheets—Sheet 2.

J. VALENTINE.
Corn Sheller.

No. 243,176. Patented June 21, 1881.

Witnesses.
Charles Selkirk
John W. Eighmy

Inventor.
Jacob Valentine
By W. Davidson Jones
atty.

N. PETERS, Photo-Lithographer, Washington, D. C.

UNITED STATES PATENT OFFICE.

JACOB VALENTINE, OF GORHAM, NEW YORK.

CORN-SHELLER.

SPECIFICATION forming part of Letters Patent No. 243,176, dated June 21, 1881.

Application filed April 21, 1881. (Model.)

*To all whom it may concern:*

Be it known that I, JACOB VALENTINE, a citizen of the United States, residing at Gorham, in the county of Ontario and State of New York, have invented certain new and useful Improvements in Corn-Shellers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in corn-shellers in which upon one shaft are mounted the driving-pulley, shelling-cylinder, a rotary blower, and a crank-disk containing a wrist-pin, whereby reciprocating motion, through suitable connections, is communicated to the sieve underneath, and is provided with a yielding concave hinged over the top of the cylinder, and the required pressure, as it extends down over one side of the cylinder, is attained by weights.

Figure 1:
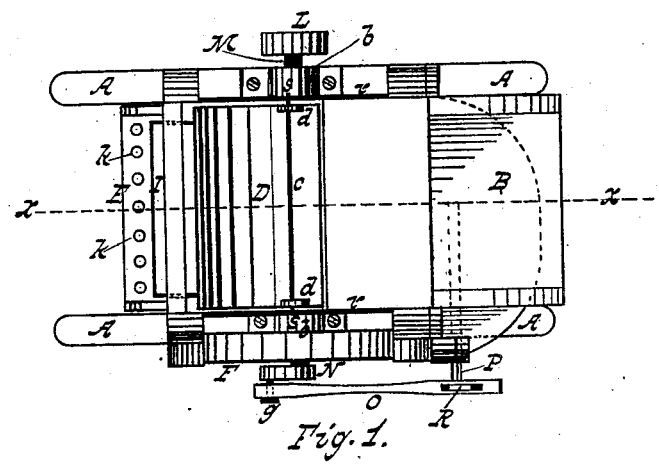
Figure 2:
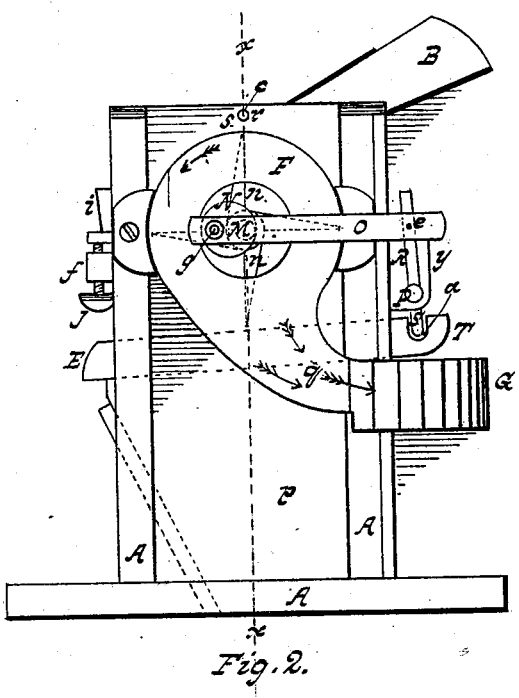
Figure 3:
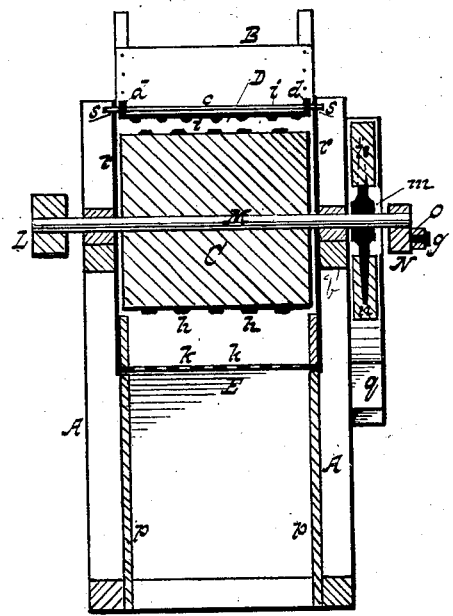
Figure 4:
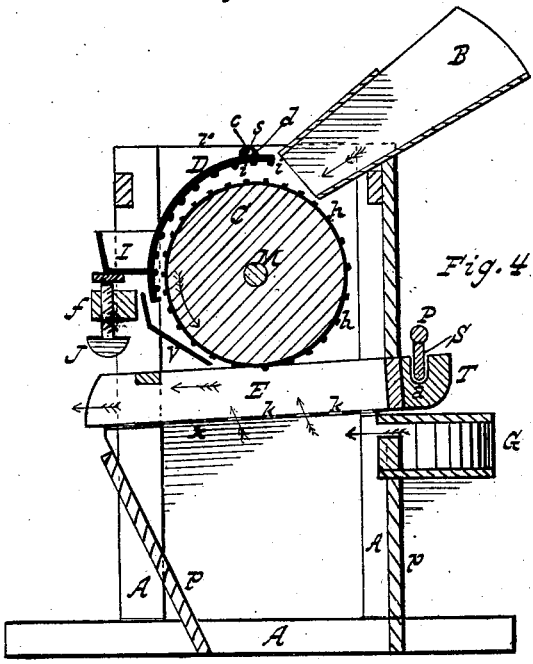

In the accompanying drawings, making part of this specification, Figure 1 is a plan. Fig. 2 is a side elevation. Fig. 3 is a sectional elevation on the line $x\,x$ in Fig. 1; and Fig. 4 is a sectional side elevation on the line $x\,x$ in Fig. 2.

Similar letters refer to similar parts throughout the several drawings.

The arrows indicate the direction of the motion of the machine and the currents of air.

Upon the frame A, constructed substantially as shown in the several drawings, I place crosswise, in suitable boxes, $b\,b$, (see Figs. 1 and 3,) a shaft, M. Upon this shaft M, I firmly secure the cylinder C, containing the teeth $h\,h$. Also, on one end of this shaft M, I secure the driving-pulley L, and upon the other end I place the rotary blower $n$, surrounded by the shell F, having a conduit, $q$, leading into the wind-box G, all substantially as shown in Figs. 1, 2, 3, and 4.

Upon the extreme end of the shaft M, just outside of the shell or case F of the blower, I secure in an eccentrical manner the crank-disk N, containing the wrist-pin $g$. (See Figs. 1, 2, and 3.)

In the sides of the casing $r$ (see Figs. 1, 2, 3, and 4) I place holes $s\,s$. Through these and corresponding holes in the lugs $d$ on the concave D is placed the rod $c$, thereby supporting the concave in position, substantially as shown. (See Figs. 1, 3, and 4.)

The concave D, provided with teeth $i$, extends nearly or about one-third of the circumference of the cylinder C, and is set so that the lower edge is somewhat closer to the cylinder than the upper edge, substantially as shown in Fig. 4.

I construct and place upon the upper portion of the frame the hopper B, (see Figs. 1, 2, 3, and 4,) so that the ears of corn will pass freely down the incline of the hopper to the space between the cylinder C and concave D.

Near the lower edge of the concave D, I attach crosswise a weight-box, I, (see Figs. 1, 2, and 4,) for the purpose of holding sufficient weight of any suitable material to cause sufficient pressure to insure perfect shelling of the corn.

The thumb-screw J (see Figs. 2 and 4) is secured in a corresponding female screw in the cross-bar $f$, to adjust the lower edge of the concave D for different-sized corn.

Underneath the cylinder, and lengthwise of the frame, I place on a slight incline, substantially as shown in Figs. 1, 2, 3, and 4, the reciprocating sieve E, provided with the perforations $k\,k$ in the bottom, and the bracket T, containing the slot $a$, firmly secured to the back end of the sieve E.

P, in Figs. 1, 2, and 4, is a rock-shaft supported in suitable boxes, $y$, having attached thereto the vibrating arms R and S.

One end of the connection O, Figs. 1, 2, and 3, is attached to the wrist-pin $g$, and the other end pivoted to the vibrating arm R on rock-shaft P by the pin $e$. The lower end of the vibrating arm S, on the rock-shaft P, enters the slot $a$ in bracket T, substantially as shown in Figs. 2 and 4.

V (see Fig. 4) is an angular chute-board, having its upper edge extending outside and above the lower edge of the concave D, with the lower edge extending under the cylinder, so as to cause the corn and cobs to be deposited upon the upper portion of the sieve E.

$p\,p$ is the casing attached to the frame below the sieve, forming the receiving-chamber for the clean shelled corn, from which it may be conveyed or taken away by any of the well-known methods.

It may be well here to observe that the upper edge of the concave D may be made adjustable by placing duplicate holes s (which are not shown) in a vertical line of the holes s s, to receive the supporting-rod c, whereby the upper edge of the concave may be placed at different heights from the cylinder C.

The operation of my invention is as follows: The parts being all properly connected and adjusted, rapid motion in the direction as indicated by the arrows is communicated through the medium of a belt from any prime motor to the pulley L, thereby causing the cylinder C, fan-wings n in the blower-case F, and crank-disk N to revolve, thereby causing a rapid current of air to pass from the blower through the conduit q into the wind-box G, and escaping from said wind-box G through the passage-way H into the receiving-box K, and up through the perforations k k in the sieve, and discharged under the chute-board V in rear of the machine. Simultaneously the connection O is rapidly vibrated by the wrist-pin in crank-disk N, thereby giving an equal reciprocating motion to the sieve E through the medium of the arms R and S on the rock-shaft P and the bracket T attached to the sieve. Corn in the ear is fed into the hopper B and passes down the incline into the upper portion of the space between the cylinder C and the concave D, where, by the conjoint action of the cylinder and concave, it is rapidly shelled. The cobs and shelled corn are then delivered by the action of the cylinder and chute-board V upon the upper portion of the sieve. The shelled corn by its specific gravity falls through the perforations therein, and the currents of air passing up through said perforations carry away, in the direction indicated, the dust and dirt, while the cobs, being too large to pass through said perforations, are gradually passed down the incline of the sieve and delivered at the rear or lower end thereof.

The advantages of my invention consist in the peculiar construction and combination of parts whereby a very compact and effective machine is produced having but few working parts, and consequently but little friction, durable, simple, and capable of shelling corn rapidly with a small amount of power.

What I claim as new, and desire to secure by Letters Patent, is—

1. In a corn-sheller, the combination of the toothed cylinder C with the yielding toothed concave, provided at or near its lower edge with a weight-box, and pivoted at its upper edge vertically over the cylinder, and a thumb-screw bearing against the weight-box, so as to adjust the lower edge of the concave, all substantially as described and set forth.

2. In a corn-sheller, the herein-described overshot-cylinder, driving-pulley, fan-blower, and crank-disk placed upon the same shaft with the cylinder, combined with an inclined hopper, weighted yielding concave, a reciprocating sieve placed under the cylinder and operated by suitable connections with the crank-disk, a wind-box to receive from the blower and discharge under and up through the perforations in the sieve a blast of air, all operating as and for the purposes herein set forth and described.

In testimony whereof I affix my signature in presence of two witnesses.

JACOB VALENTINE.

Witnesses:
N. BOWEN COOK,
CORNELIUS LOUDON.